United States Patent [19]

Shimada

[11] 4,386,364
[45] May 31, 1983

[54] IMAGE DISPLAY APPARATUS
[75] Inventor: Satoshi Shimada, Yokohama, Japan
[73] Assignee: Sony Corporation, Tokyo, Japan
[21] Appl. No.: 300,962
[22] Filed: Sep. 10, 1981
[30] Foreign Application Priority Data Sep. 12, 1980 [JP] Japan ................................ 55-126876
Sep. 20, 1980 [JP] Japan ................................ 55-131068

[51] Int. Cl.³ .......................... H04N 9/22; H04N 5/68
[52] U.S. Cl. ......................................... 358/66; 358/242
[58] Field of Search ........................ 358/56, 64–67,
358/69, 70, 242; 313/413–415, 409, 422, 471,
495; 315/13 R, 169.1, 169.2, 169.3

[56] References Cited
U.S. PATENT DOCUMENTS

4,158,210 6/1979 Watanabe et al. .................. 358/242

Primary Examiner—John C. Martin
Attorney, Agent, or Firm—Lewis H. Eslinger; Alvin Sinderbrand

[57] ABSTRACT

An image display apparatus includes a phosphor screen which is divided into a plurality of phosphor screen portions arranged in both horizontal and vertical directions, a set of an electron gun and horizontal and vertical deflection devices provided in opposed relation to each of the divided phosphor screen portions, the electron gun being formed integrally of a common metal plate at plural divided phosphor screen portions at least adjacent in both horizontal and vertical directions, a circuit for driving the deflecting devices at the same time over all the surface of the phosphor screen, a circuit for the vertical deflection device at a horizontal period in a step, a device for memorizing at least one period of a video signal, and a circuit for dividing the video signal in accordance with the division in the horizontal direction, reading out divided video signals separately and simultaneously and supplying read-out video signals to the electron guns arranged on one line in the horizontal direction, wherein the phosphor screen is formed of red, green and blue color phosphor stripes and a black guard band, which are repeated arranged with a predetermined pitch, the guard band being located at a position coincident with the divided position of the phosphor screen in the horizontal direction.

19 Claims, 20 Drawing Figures

IMAGE DISPLAY APPARATUS

BACKGROUND OF THE INVENTION

1. Field of the Invention

The present invention relates generally to an image display apparatus, and is directed more particularly to an image display apparatus for use with a color television receiver.

2. Description of the Prior Art

In the art, a cathode ray tube is usually employed as an image display apparatus in which the electron beam emitted from a single electron gun is used to scan the entire display plane. According to this prior art display apparatus, a predetermined distance is required for deflecting the electron beam. This distance becomes large with a large display apparatus, resulting in an apparatus with an undesirably large depth. An image display apparatus has been proposed in which a display device is provided for each picture element and each display device is driven in response to the level of a part of the video signal to display an image. In this case, the display device must have about three hundred thousand picture elements with corresponding wirings, producing a very complicated structure.

OBJECTS AND SUMMARY OF THE INVENTION

Accordingly, it is an object of the present invention to provide a novel image display apparatus which is simple in construction, large in size and thin or flat in depth.

According to the present invention, there is provided an image display apparatus for displaying an image from a video signal having at least one period, which comprises:

a phosphor screen which is divided into a plurality of phosphor screen portions arranged in both horizontal and vertical directions, the phosphor screen having repeated thereon at a predetermined pitch red, green and blue phosphor stripes and a black guard band, each of the black guard bands being located along each of the vertical divisions of the phosphor screen;

a set of an electron gun and horizontal and vertical deflection means provided in opposed relation to each of the divided phosphor screen portions, the electron guns being integrally formed by a metal plate and arranged in horizontal rows;

means for driving the deflection means at the same time over the surface of the phosphor screen;

means for driving in a predetermined step the vertical deflection means in synchronism with a horizontal scan of the phosphor screen;

means for storing at least one of the periods of the video signal; and means for dividing the video signal in accordance with the horizontal divisions of the phosphor screen and simultaneously supplying the divided video signals to the electron guns arranged on one of the horizontal rows.

The above, and other objects, features and advantages of the invention will be apparent from the following detailed description of illustrative embodiments thereof which is to be read in connection with the accompanying drawings.

DESCRIPTION OF THE PREFERRED EMBODIMENTS

Figure 1:
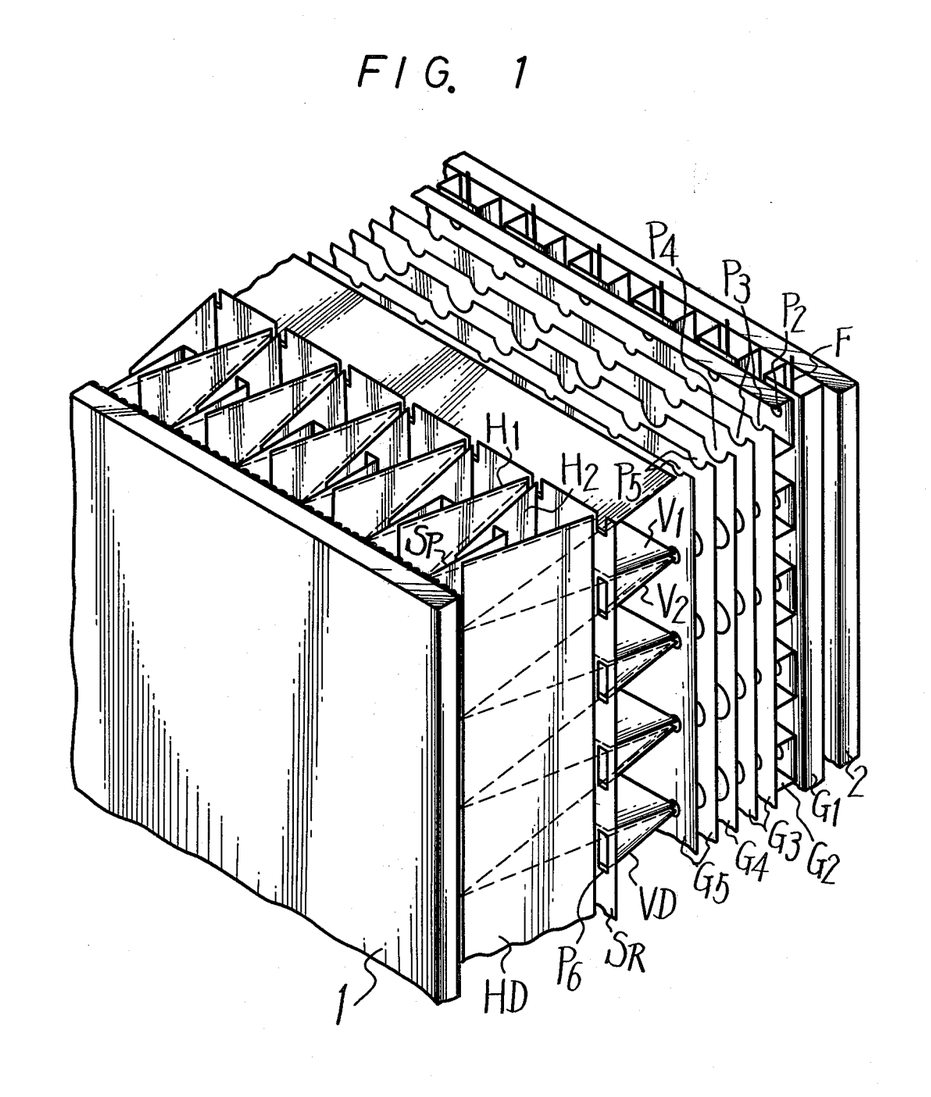
FIG. 1 is an exploded perspective, cutaway view of an image display apparatus according to the present invention.

In FIGS. 1 and 2 the illustrated embodiment of an image display apparatus includes a front glass panel or plate 1 which has phosphor coated thereon, as will be described later, and a back glass plate 2. Between glass plates 1 and 2 there are provided sets of electron guns and horizontal and vertical deflection means. The number of horizontal and vertical deflection means is the same as the number of divided phosphor screens, and the deflection means are arranged at positions corresponding to the divided phosphor screen portions, as will be described later.

In the illustrated embodiment, each of the electron guns is formed of a filament F, a first grid $G_1$ for modulating an electron beam emitted from filament F, a second grid $G_2$ for gating the electron beam, and third to fifth grids $G_3$ to $G_5$ for accelerating and converging the electron beam. Filament F and grids $G_1$ to $G_5$ are arranged in the above described order from back glass plate 2 to front glass plate 1.

First grid $G_1$ is made of a metal plate which extends in a vertical direction and has a U-shaped horizontal cross-section. The open side of grid $G_1$ is located such that it faces back glass plate 2. First grids $G_1$ are equally spaced and are the same in number as the number of the divided phosphor screen portions in the horizontal direction and are identified as $G_{11}$, $G_{12}$. One filament F is positioned within each of grids $G_1$ and extends in the vertical direction.

Second grids $G_2$ are each made of a metal plate which extends in the horizontal direction and has a U-shaped vertical cross-section. The open sides of grids $G_2$ face the front glass plate 1. Second grids $G_2$ are the same in number as the number of phosphor screen portions in the vertical direction and are equally spaced. Second grids $G_2$ are individually identified as $G_{21}$, $G_{22}$. Grid apertures or bores $P_1$ and $P_2$ are formed the centers of portions of first and second grids $G_1$ and $G_2$, respectively opposite the intersection points thereof.

Third and fifth grids $G_3$ and $G_5$ are each formed of planar a set of metal plates or flat plates. Fourth grid $G_4$ is made of a single planar metal plate. Grid apertures or bores $P_3$ to $P_5$ having a predetermined size are formed through the positions of respective grids (comprising metal plates) $G_3$ to $G_5$ corresponding to the bores $P_1$ and $P_2$ of first and second grids $G_1$ and $G_2$. Bores $P_3$ to $P_5$ are formed on an extension of a line extending through bores $P_1$ and $P_2$, so that filament F can be seen from front glass plate 1 through bores $P_1$ to $P_5$. In the illustrated embodiment, bore $P_5$ formed in the metal plate of grid $G_5$ at a side of the phosphor screen may be elongate, for example, in a lateral or horizontal direction for limiting the electron beam in the vertical direction.

Further, in the front of bore $P_5$ of fifth grid $G_5$ or at the side of front glass panel 1, a vertical deflection electrode VD is provided which comprises two metal plates $V_1$ and $V_2$ each extending in the horizontal direction (FIG. 1). The two metal plates $V_1$ and $V_2$ are arranged in an approximately V-shape with the open end of the V facing front glass plate 1. Vertical deflection electrodes VD, numbering the same as the number of phosphor screen portions in vertical direction, are located in opposed relation to bores $P_5$ of fifth grid $G_5$.

At the front side of vertical deflection electrode VD there is provided a horizontal deflection electrode HD which comprises metal plates $H_1$ and $H_2$, each extending vertically. The two metal plates $H_1$ and $H_2$ are arranged in an approximate V-shape, with the open end of the V facing front glass plate 1. Horizontal deflection electrodes HD, numbering the same as the number of the phosphor screen portions in the horizontal direction, are located in opposed relation to bores $P_5$ of fifth grids $G_5$. A support plate $S_R$ is positioned between vertical and horizontal deflection electrodes VD and HD and has bores $P_6$ at positions corresponding to bores $P_5$ to shield the electric field between electrodes VD and HD and also to limit the beam width in the horizontal direction by bores $P_6$. Thus, the configuration of the beam on each of the divided phosphor screens is limited to an approximately a rectangular shape with the longer dimension in the vertical direction. The accuracy of the position of the beam striking each phosphor screen is accordingly increased.

With the above embodiment of the invention, when filament F is heated, and a video signal is supplied to first grid $G_1$ or filament F, and second grids $G_2$ are sequentially charged to a high potential (gated ON) in a predetermined timing, the resulting emitted electron beam is modulated by the video signal in the corresponding period. The electron beam thus emitted is accelerated by third to fifth grids $G_3$ to $G_5$, deflected by deflection electrodes VD and HD, and then strikes the phosphor screen formed on front glass plate 1.

In an exemplary embodiment, sixty-four sets of the electron guns and vertical and horizontal deflection means are arranged in the horizontal direction and thirty sets are arranged in the vertical direction, so that 1920 sets are arranged in a matrix.

Figure 7:
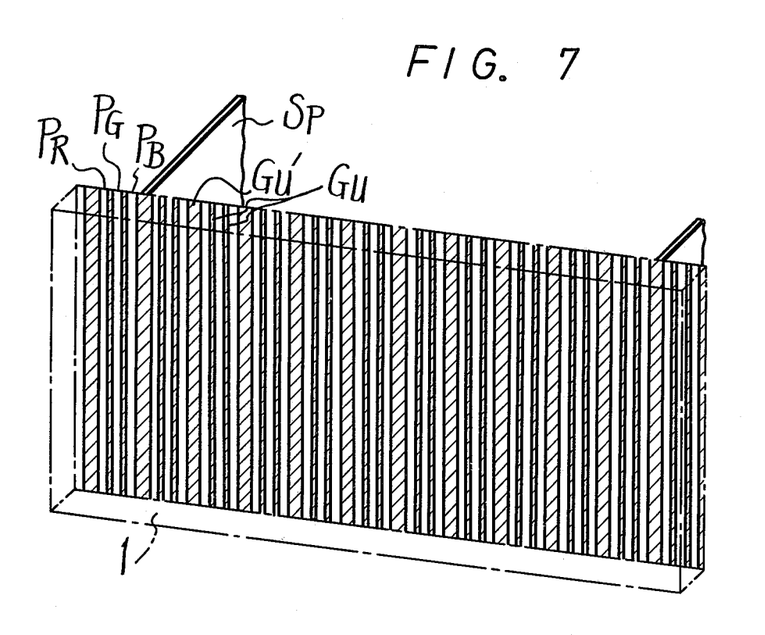
FIG. 7 is a perspective, cutaway view of a phosphor screen of the invention.

When the above described embodiment is formed as, for example, an image display apparatus having a diagonal dimension of 40 inches, the electron guns are arranged at 1.25 cm pitch in the horizontal direction and at 2.0 cm pitch in the vertical direction. Accordingly, the horizontal dimension is 80 cm, the height is 60 cm and the depth is 7 cm. Further, the number of picture elements operated by one electron gun is 640 RGB trio $\div$ 64 divisions = 10 RGB trio (namely, 1.25 mm trio pitch) in the horizontal direction and 480 effective scanning lines $\div$ 30 divisions = 16 scanning lines (namely, 1.25 mm scanning line pitch), and, in sum, 10 RGB trio $\times$ 16 (scanning lines) = 160 RGB trio. Thus, the entire picture elements are 160 RGB trio $\times$ 64 H-div. $\times$ 30 V-div. $\div$ 300,000. Furthermore, the 1.25 mm trio pitch is formed by a phosphor screen coated on the front glass plate 1, as shown in FIG. 7, in which color phosphor stripes $P_R$, $P_G$, $P_B$ each have the width of 0.25 mm, each guard band $G_u$ has a width of 0.125 mm and each guard band $G_u'$ has a width of 0.25 mm.

Figure 3:
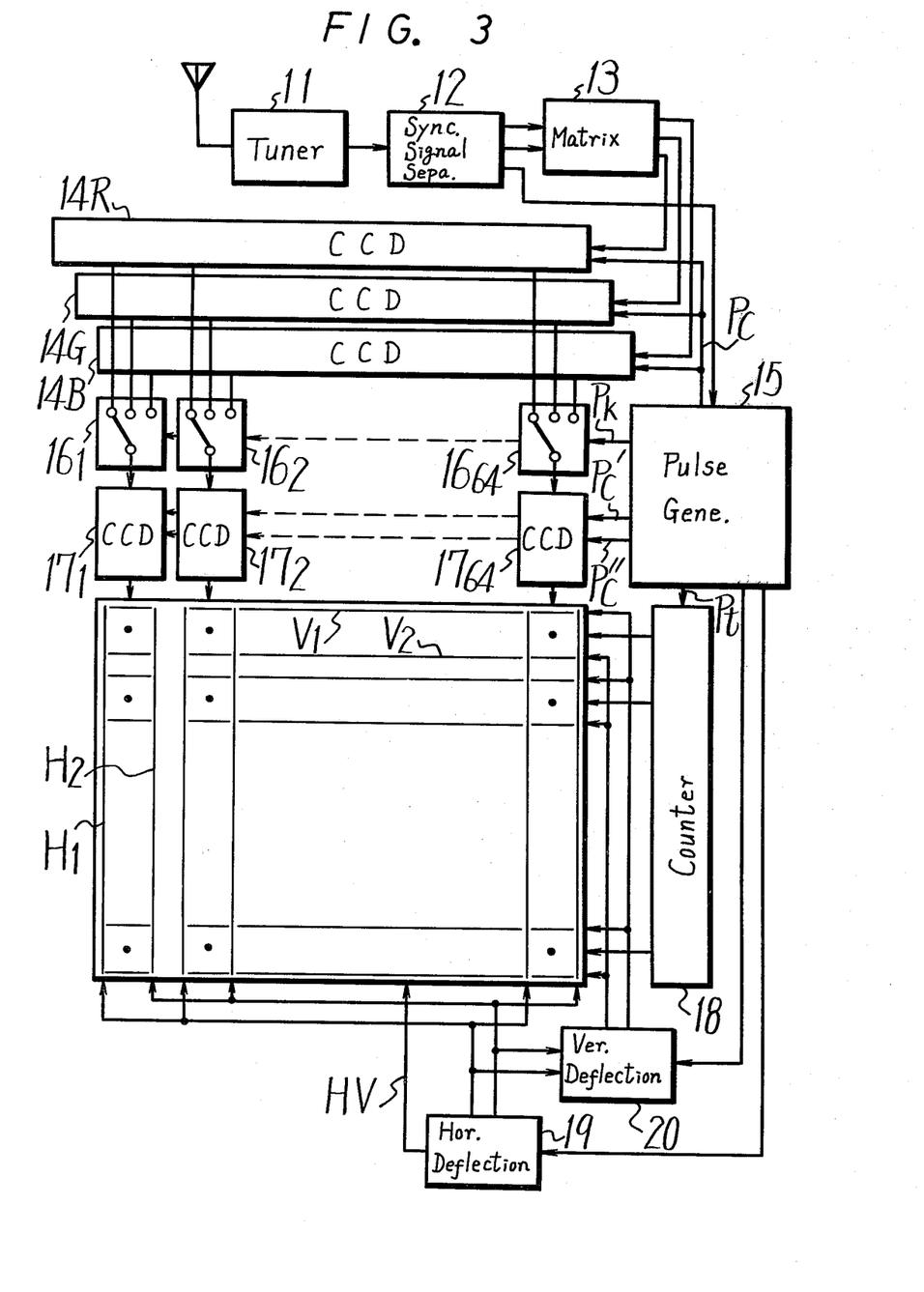
FIG. 3 is a block diagram showing an example of a signal system used in the invention.

With the above described embodiment of the invention, a video signal, and a voltage for the second grid and horizontal and vertical deflection voltages are supplied with the exemplary signal system of FIG. 3. In the illustrated signal system, for example, an NTSC color television signal is received and demodulated by a tuner 11 and is supplied to a separating circuit 12 for separating the luminance signal, chroma signal and horizontal and vertical synchronizing signals. The separated luminance signal and chroma signal are fed to a matrix circuit 13 from which red, green and blue primary color signals are derived. These three primary color signals are supplied to CCDs (charge-coupled device) 14R, 14G and 14B, respectively, each comprising, for example, 630 stages.

The synchronizing signals separated by separating circuit 12 are fed to a pulse generating circuit 15 which then produces pulses having different timings. A clock pulse $P_C$, supplied by pulse generating circuit 15 and having a timing corresponding to 640 divisions of the video portion in one horizontal period, is fed to the clock terminals of CCDs 14R, 14G and 14B.

Further, the input terminals of CCDs 14R, 14G and 14B are connected in combination to a switch $16_1$ having three-input terminals. The intermediate output terminals at every 10th stage from the input sides at the corresponding stages of CCDs 14R, 14G and 14B are connected in combination to switches $16_2$ to $16_{64}$, respectively.

A switch signal $P_K$ having a frequency three times that of clock pulse $P_C$ is produced from pulse generating circuit 15 and supplied to switches $16_1$ to $16_{64}$ from which the signals from CCDs 14R, 14G and 14B are derived in a time-sharing manner.

The signals from switches $16_1$ to $16_{64}$ are supplied to corresponding CCDs $17_1$, $17_2$, ... $17_{64}$, each having 30 stages.

Figure 4A:
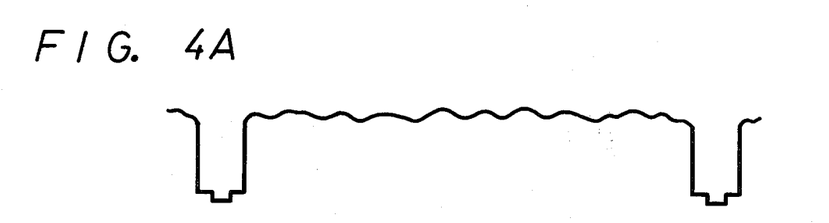
FIGS. 4, 5 and 6 are waveform diagrams used to explain the operation of the invention.
Figure 4B:
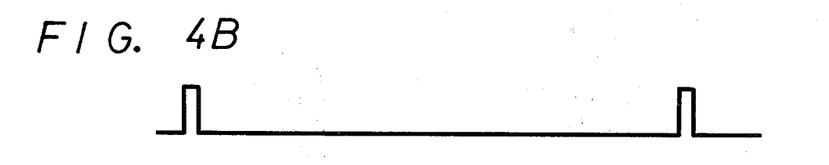
Figure 4C:
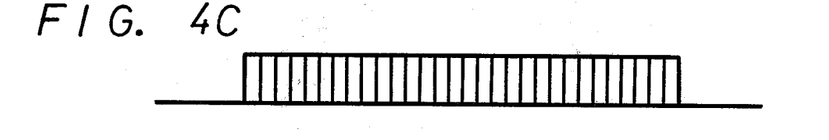

A high frequency clock pulse $P_C'$ supplied by pulse generating circuit 15 has the same frequency as switch signal $P_K$. Clock pulse $P_C'$ is supplied to CCDs $17_1$ to $17_{64}$ so that the signals from switches $16_1$ to $16_{64}$ are written in CCDs $17_1$ to $17_{64}$, respectively. Further, a low frequency clock pulse $P_C''$ is supplied by pulse generating circuit 15 and has a frequency 1/63 that of switch signal $P_K$. Clock pulse $P_C'$ to CCDs $17_1$ to $17_{64}$ so that the signals written therein are respectively read out therefrom. In the illustrated embodiment, the write-in and read-out timings are selected as follows: for the video signal having one horizontal period as shown in FIG. 4A, the write-in is carried out in the last 1/64 portion of the period, as shown in FIG. 4B, and the read-out is carried out in the first 63/64 portions of the period in the next horizontal period, as shown in FIG. 4C.

The signals read out from CCDs $17_1$ to $17_{64}$ are applied to first grid $G_1$ or grids $G_{11}$, $G_{12}$, ... $G_{164}$ respectively.

A timing pulse $P_t$ is derived from pulse generating circuit 15 and is in synchronism with the horizontal synchronizing signal. Pulse $P_t$ corresponds to a 30-division of the video period (480 horizontal periods) in one vertical period. Timing pulse $P_t$ is fed to a 30-scale counter 18 which then supplies from its output terminals gate pulse signals to second grid $G_2$ or grids $G_{21}$, $G_{22}$, ... $G_{230}$, respectively.

Figure 5A:
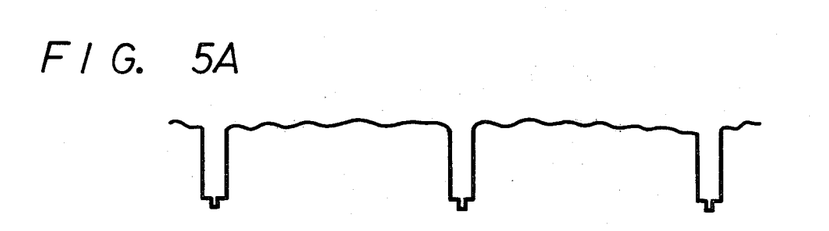
Figure 5B:
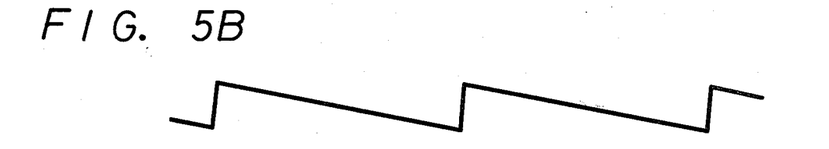
Figure 5C:
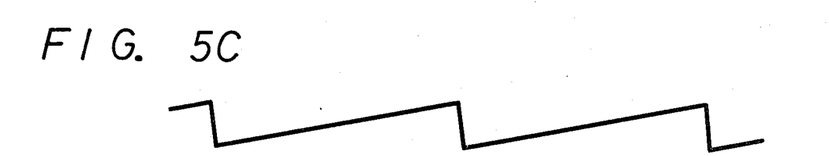
Figure 6A:
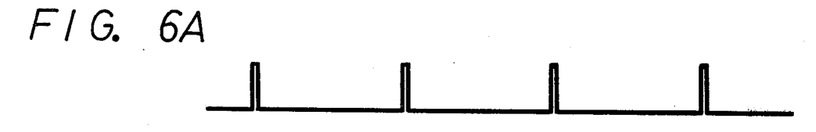
Figure 6B:
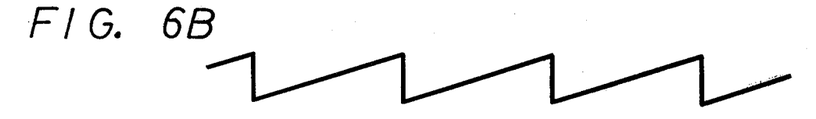
Figure 6C:
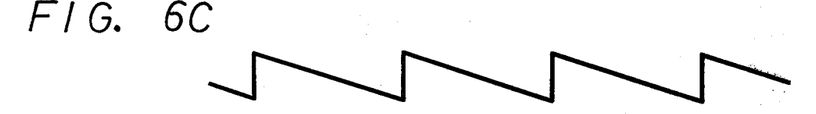
Figure 6D:
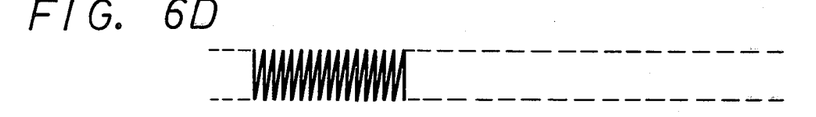
Figure 6E:
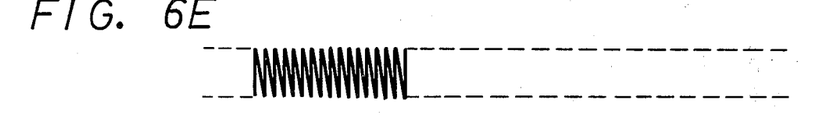
Figure 6F:
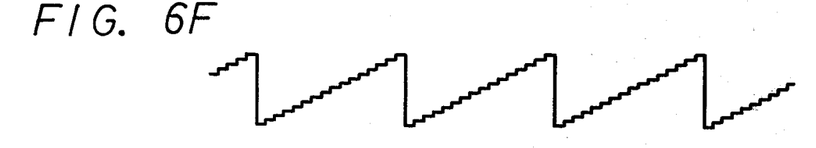
Figure 6G:
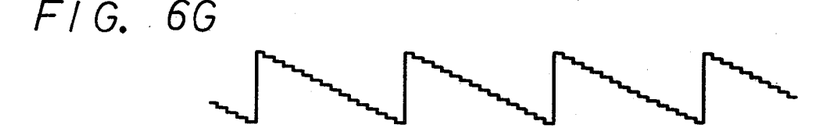

A horizontal synchronizing signal from pulse generating circuit 15, as shown in FIG. 5A, is supplied to a horizontal deflection circuit 19 which then produces saw-tooth horizontal deflection signals, as shown in FIGS. 5B and 5C. The saw-tooth horizontal deflection signals are applied to horizontal deflection electrodes $H_1$ and $H_2$. The timing pulse $P_t$, as shown in FIG. 6A, from pulse generating circuit 15, is also supplied to a vertical deflection circuit 20 which then produces saw-tooth vertical deflection signals, as shown in FIGS. 6B and 6C. The horizontal deflection signals from horizontal deflection circuit 19 of FIGS. 6D and 6E are fed to a vertical deflection circuit 20. These signals are combined to form vertical deflection signals in vertical deflection circuit 20, are varied in a step-like manner with the horizontal synchronization, as shown in FIG. 6F and 6G, and are applied to vertical deflection electrodes $V_1$ and $V_2$. A high voltage HV produced by horizontal deflection circuit 19 is applied to third and fifth grids $G_3$ and $G_5$, support shielding plates or partition plates $S_p$, $S_q$, and the phosphor screen.

In the phosphor screen of FIG. 7, red, green and blue color phosphor stripes $P_R$, $P_G$ and $P_B$, each extending in the vertical direction, are located in sequence on the inner surface of front glass plate 1 with a black guard band $G_u$ provided between adjacent phosphor stripes. In the illustrated example, a guard band $G_u'$, is provided between blue phosphor stripe $P_B$ and red phosphor stripe $P_R$ and is wider than guard band $G_u$. The three primary color phosphor stripes $P_R$, $P_G$ and $P_B$, comprising 640 sets in one embodiment, are positioned between guard bands $G_u'$. Phosphor stripes $P_R$, $P_G$ and $P_B$ extend over the entire surface of front glass plate 1 in the horizontal direction.

The phosphor screen as described above is divided at every 10 sets of phosphor stripes, and with the divided phosphor screen portions located so that their center lines are opposite bores $P_5$ of the respective electron guns shown in FIG. 1.

A partition plate $S_p$, as shown in FIG. 1, extends vertically opposite guard band $G_u'$ at the boundary of every 10 sets of the phosphor stripes and is positioned between horizontal deflection electrodes $H_1$ and $H_2$.

According to the embodiment described above, electron beams are emitted in response to signals from CCDs $17_1$ and $17_{64}$, are deflected in the horizontal and vertical directions, and then strike the corresponding portions of the divided phosphor screen. Signals from CCDs $17_1$ to $17_{64}$ are derived by dividing the signal of the horizontal period and correspond to the respective phosphor screen portions. The display is simultaneously carried out by the respective electron guns arranged in the horizontal direction. One horizontal scanning line is displayed as a whole. The displayed horizontal scanning line is scanned vertically, and after the vertical scanning by one electron gun is finished, the next electron gun in the vertical direction is gated ON and scans the displayed scanning line. This scanning is sequentially carried out in the vertical direction, whereby the received video signal is reproduced.

With the invention, since each electron gun scans a narrow area of the phosphor screen portion, the vertical and horizontal deflection angles of each electron gun are small and the distance necessary for deflection of the electron beam therefrom is small, so that the image display apparatus is shallow in depth.

Further, with an apparatus according to the invention, the number of wirings is about 100 for video lines connected to 64 first grids $G_1$, for the signal lines of counter 18 connected to 30 second grids $G_2$, for the vertical deflection signal lines, for the horizontal deflection signal lines, for the high voltage lines and so on, so that construction is relatively simple.

Moreover, in an apparatus according to the invention a number of the electron guns can be formed, so that the apparatus is simple in structure and integrally can be easily made especially since the third to fifth grids $G_3$ to $G_5$ are made merely by forming bores $P_3$ to $P_5$ at the desired positions on the metal plates thereof.

Further according to the invention, since the vertical deflection signal is varied in a step-like manner, the vertical positions at the start and end of the horizontal scanning in each divided phosphor screen are equal and hence the horizontal scanning line can be displayed on a single line. The breaks in the horizontal direction can be made to be very smooth, thereby producing a good picture.

Since the distance from the electron gun to the phosphor screen is small, the electron beam does not diverge very much in diameter, and accordingly, a very sharp picture can be reproduced.

Further, the horizontal scanning velocity of each electron beam is 1/64th that of a conventional apparatus, while the amount of the electron beam irradiated on each phosphor screen portion increases 64 times, so that the amount of emitted electron beam can be reduced 1/64 that of a conventional apparatus and hence, the electron beam can be made still further smaller or thinner in diameter.

As described above, according to the apparatus of the invention, since the electron beam is thin and its scanning velocity is low, the place where the electron beam strikes the phosphor screen can be very accurately determined. For this reason, without using a beam selecting means such as shadow mask or the like as in the prior art, the beam modulating signals are sequentially switched in time as red, green and blue so as to make it possible to carry out a three color display of a dot-sequential system. The irradiation efficiency of electron beam is accordingly increased so that the amount of the emitted electron beam can be still further reduced and the electron beam can be made even thinner.

Figure 2A:
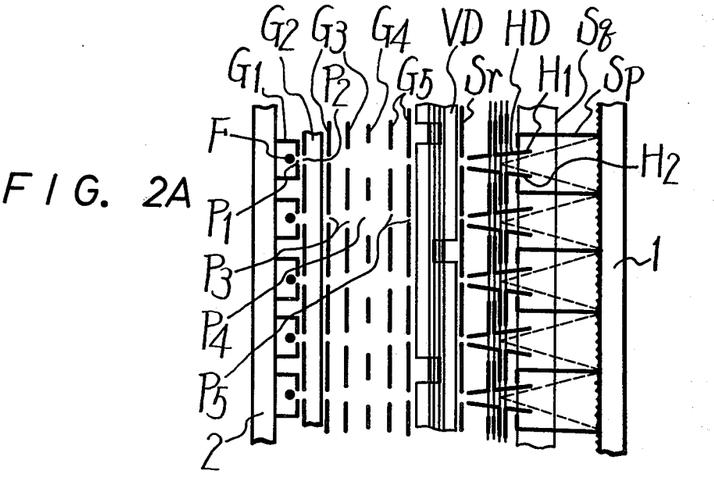
FIG. 2A is a partial, horizontal cross-sectional view of the image display apparatus of FIG. 1.
Figure 2B:
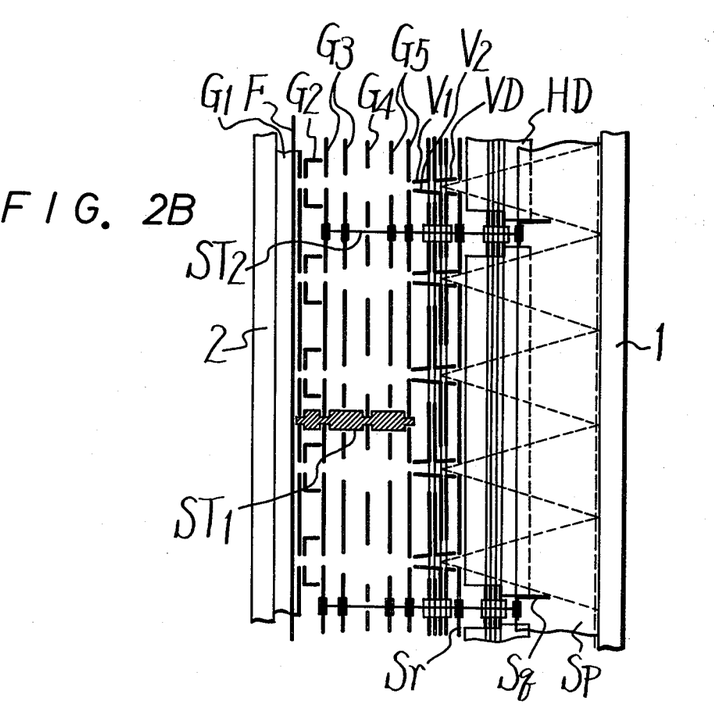
FIG. 2B is a partial, vertical cross-sectional view of the image display apparatus of FIG. 1.
Figure 2C:
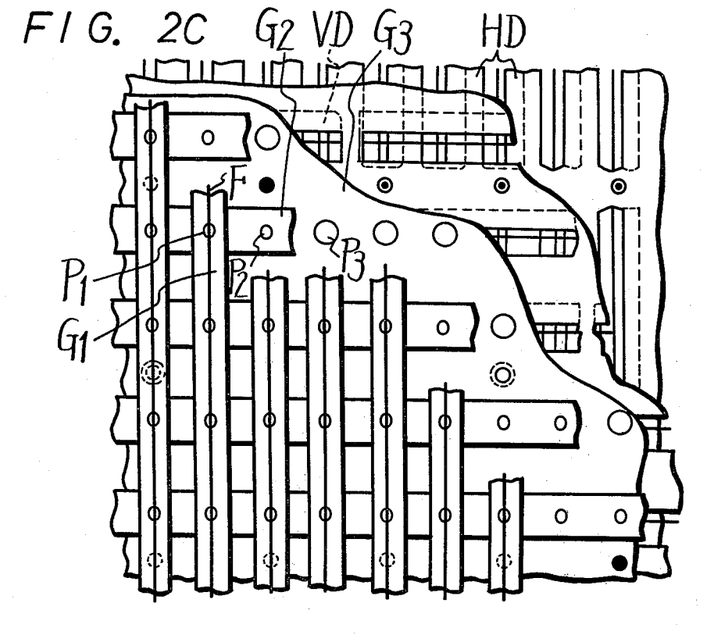
FIG. 2C is a partial, back plan view of the image display apparatus of FIG. 1 with portions of the apparatus cutaway to show detail.
Figure 2D:
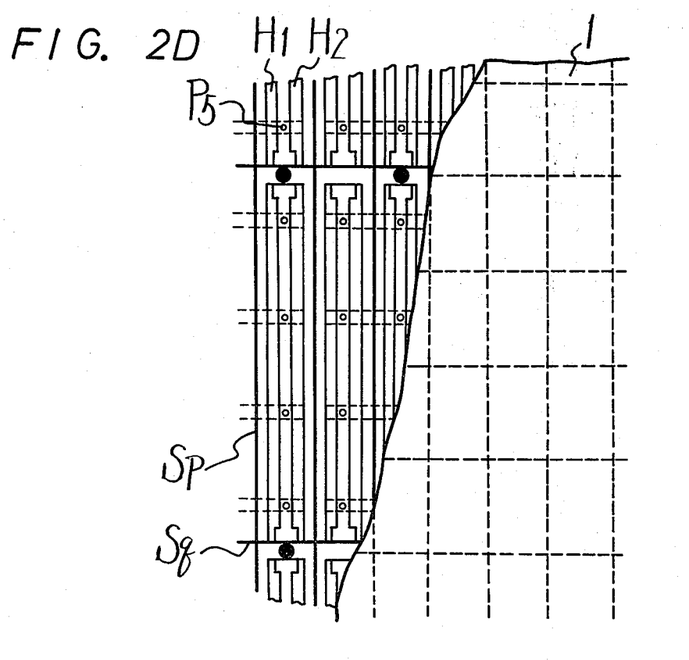
FIG. 2D is a partial, front plan view of the image display apparatus of FIG. 1 with a portion of the apparatus cutaway to show detail.
Figure 8A:
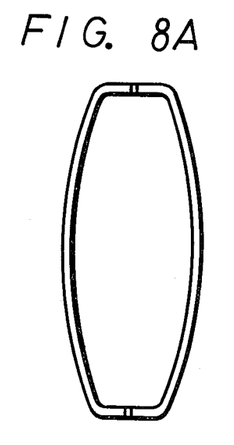
FIGS. 8A, 8B and 8C are schematic cross-sectional diagrams illustrating a cathode ray tube for use with the invention.
Figure 8B:
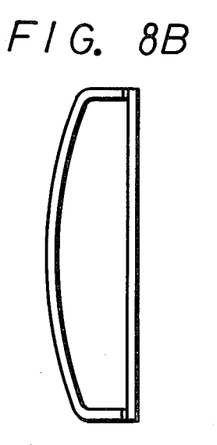
Figure 8C:
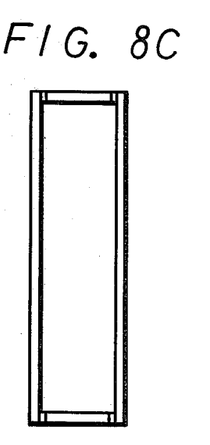

FIG. 8 illustrates three possible cross-sectional views of cathode ray tubes in accord with the present invention. In FIG. 8A, the front portion of a cathode ray tube is formed of two parts coupled or sealed together. In FIG. 8B, one of the two parts of the cathode ray tube is made of a flat plate. In FIG. 8C, the two parts of the cathode ray tube are made of a flat plate whose peripheral portions are sealed up by sealing material. In FIG. 8C, since there is a possibility that the center portions of the flat plates could collapse or become concave from the external atmospheric pressure, the flat plates can be supported by partition plates $S_p$ (as shown in FIG. 1) which is made partially on a rigid body in the cathode ray tube of FIG. 8C. In this case, however, the thickness of the part of each partition plate $S_p$ contacting the phosphor screen is smaller than the width of guard band $G_u'$. For example, when the width of guard band $G_u'$ is about 0.25 mm as described above, the thickness of the partition plate $S_p$ near the above contact portion is about 0.15 mm. Therefore, it is rather difficult for the partition plate SP to provide the rigidity necessary to accommodate the external pressure on the vacuum tube. According to the invention in which an electron beam emitted from one electron gun scans in the horizontal and vertical directions, a relatively wide clearance or gap is provided at the back of the phosphor screen in both the vertical and horizontal directions and through which no electron beam passes. Partition plate $S_p$ is located in a vertical clearance, with auxiliary partition plate $S_q$ located in a horizontal clearance, as shown in FIGS. 2A and 2B, thus providing parallel crosses by partition plates $S_p$ and $S_q$. Thus, the rigidity provided by partition plates $S_p$ which would otherwise be insufficient can be reinforced. In an alternate embodiment partition plates $S_p$ can be coupled through rods passing through the horizontal clearance in lieu of auxiliary partition plate $S_q$. The illustrated partition plate structure is effective for a flat plate type display apparatus as shown in FIGS. 1, 2 and 8C.

When the front glass plate or panel has a curved surface similar to an ordinary color cathode ray tube as shown in FIGS. 8A and 8B, the vacuum tube can be made with sufficient strength without having partition plate $S_p$ contacting the front glass plate or phosphor thereby utilizing the intermediate portions to withstand the external atmospheric pressure. In such a case, however, the internal structure can be divided in two different means. One means can be a demountable system in which the entire flat phosphor screen and parallel electrode structure is suspended within a vacuum tube (refer to FIGS. 8A and 8B) independently of the curved surface of the front glass panel. In the other means, the three color phosphor stripes are coated on the inner surface of the curved front glass panel and the inner corresponding electrode surface is formed as a coaxial curved surface, or a radially divided structure corresponding to the curved front glass panel surface. In the case of the latter means, the curved surface of the front glass panel can be formed as a spherical surface in one case and as a so-called cylindrical surface in another case. In the former case, the internal electrode structure is formed as a coaxial spherical surface. In the latter case, a flat surface can be deformed to form a coaxial cylindrical surface.

As hereinbefore described, the apparatus according to the invention is sealed in the vacuum tube or envelope.

Respective grids $G_1$ to $G_5$, vertical and horizontal deflection electrodes $V_1$, $V_2$, $H_1$, $H_2$ and so on can be integrally formed throughout in the apparatus. It is also possible that the elements can be divided for ease in manufacturing. Since fifth grid $G_5$ is indicated with a large amount of the electron beam, any thermal expansion of bore $P_5$ can be accommodated by dividing the metal plate which forms fifth grid $G_5$ into more than one to accordingly reduce the influence of the thermal expansion.

Further, as shown in FIG. 2, an insulating support $S_{T1}$ is positioned at the necessary portions of grids $G_1$ to $G_5$ and partition plate $S_p$. A conductive support $S_{T2}$ can also be provided between grids $G_1$ to $G_5$. Supports $S_{T1}$ and $S_{t2}$ render the apparatus mechanically whole and prevent the positional displacement of bores $P_1$ to $P_5$.

Figure 6H:
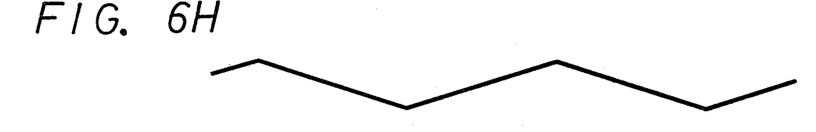
Figure 6I:
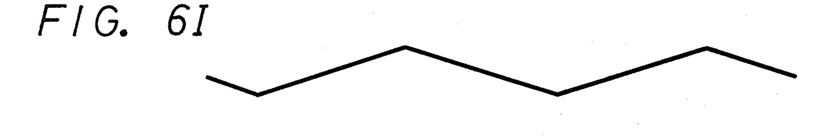
Figure 9A:
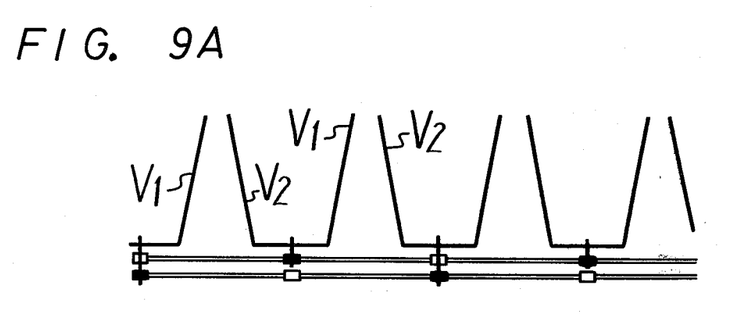
FIGS. 9A, 9B and 9C are partial schematic diagrams of the vertical deflection electrodes of the invention.
Figure 9B:
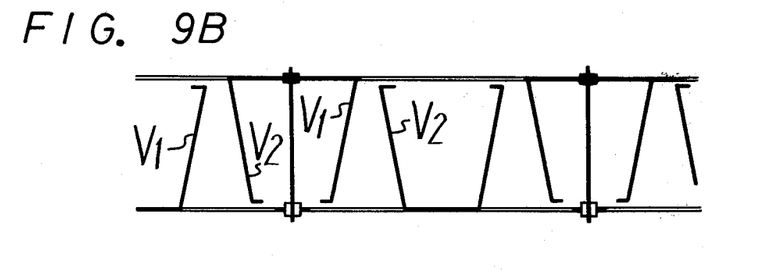
Figure 9C:
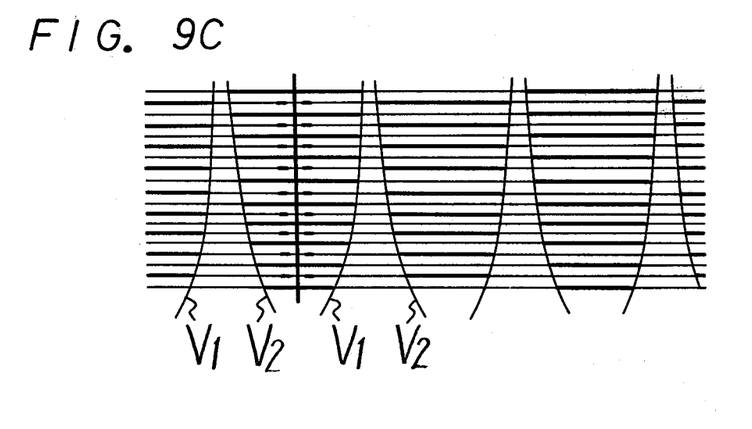

Vertical deflection electrodes $V_1$ and $V_2$ need not be made of two metal plates arranged in a V-shape as shown in FIG. 1 or four metal plates arranged in a V-shape as shown in FIG. 2. Vertical deflection electrodes $V_1$ and $V_2$ can be bent as shown in FIG. 9A, can be made of two punched metal plates each having an I-shape and then bent as shown in FIG. 9B, or can be made of a number of laminated metal plates each having a bore formed therethrough of a predetermined size as shown in FIG. 9C. In the vertical deflection electrodes shown in FIG. 9, the potential relation between adjacent vertical deflection electrodes is opposite from that shown in FIGS. 1 and 2. Accordingly, the deflection signal at every other vertical deflection is oppositely varied, so that the vertical deflection is performed by the deflection signals which vary as a whole in accord with the triangular shape shown in FIGS. 6H and 6I.

Figure 10A:
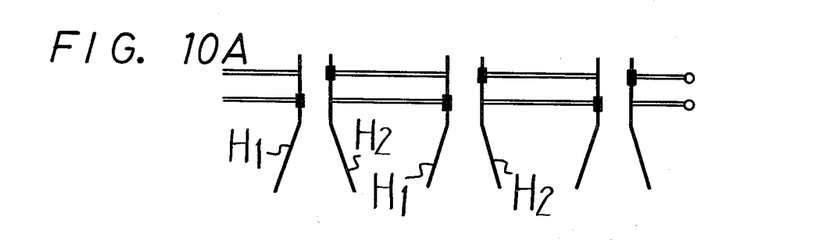
FIGS. 10A, 10B and 10C are partial schematic diagrams of horizontal deflection electrodes of the invention.
Figure 10B:
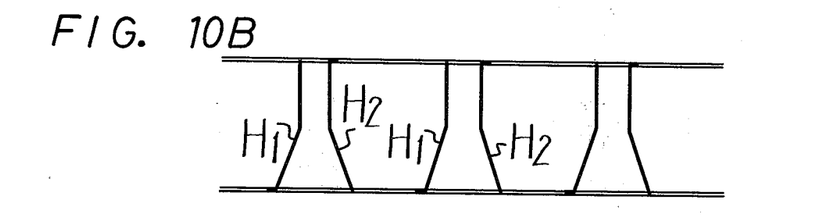
Figure 10C:
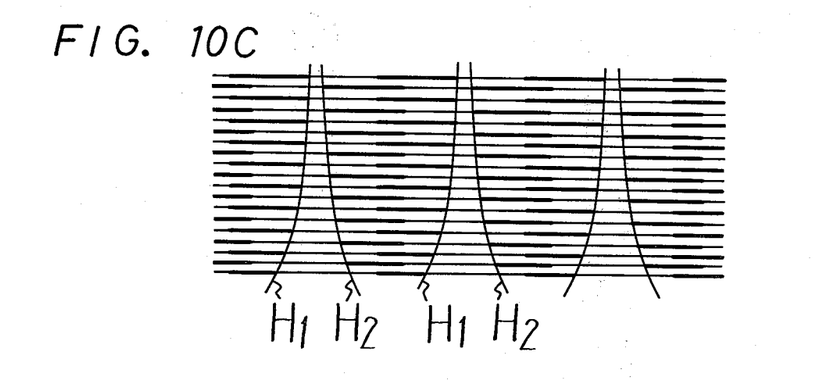
Figure 11:
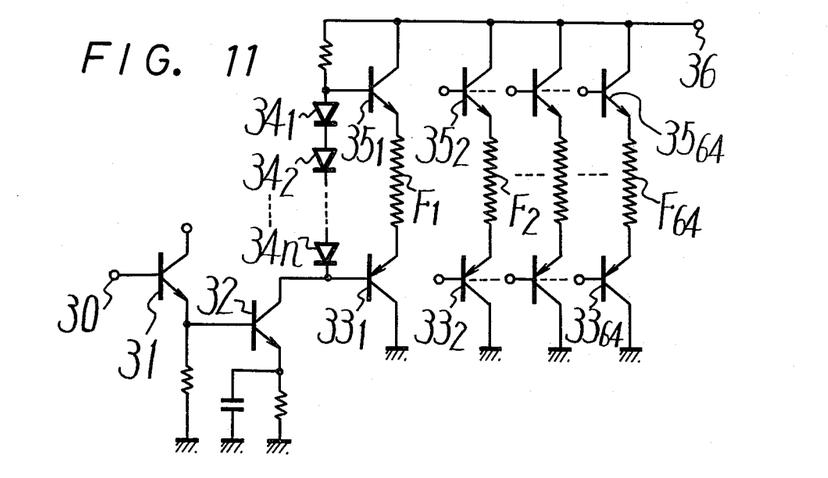
FIG. 11 is a schematic diagram of a filament drive circuit according to the invention.

FIGS. 10A to 10C show examples of horizontal deflection electrodes $H_1$ and $H_2$. In FIG. 10A, two metal plates are used in a V-shape so that the open end of the V faces the phosphor screen and the electrodes are connected through conductive lines. In FIG. 10B, two metal plates, each punched in a U-shape and then bent, are combined, and a conductive wire is connected to each of the metal plates. In FIG. 10C, a number of metal plates, each having formed therethrough a bore of a predetermined size, are laminated. Alternate metal plates are connected together and a conductive wire is connected to each of them. FIG. 11 illustrates an example of a filament drive circuit which supplies the video signal to filament F. In FIG. 11, an input terminal 30 is supplied a signal from, for example, CCD $17_1$. Input terminal 30 is connected through NPN-type transistors 31 and 32 to the base of a PNP-type transistor 33 ($33_1$) whose collector is connected to ground. Transistor 32 is connected through backward diodes $34_1$ to $34_n$ to the base of an NPN-type transistor 35 ($35_1$) which has the collector connected to a power supply terminal 36. A filament F ($F_1$) is inserted between the emitters of transistors 33 and 35 ($33_1$ and $35_1$).

In the filament drive circuit of FIG. 11, a constant voltage determined by diodes $34_1$ to $34_n$ is applied across filament F and varies in response to the signal applied to input terminal 30. The above circuit is provided between CCDs $17_1$ to $17_{64}$ and filaments $F_1$ to $F_{64}$ (with the suffixes "1" to "64" referring to FIG. 11), whereby the heating voltages and video signals are supplied to the respective filaments. In an alternate filament drive circuit while the divided simultaneous drive video signal is supplied to the grid group $G_1$ shown in FIGS. 1 and 2, filament F can be energized by the drive circuit of FIG. 11 and at the same time terminal 30 of transistor 31 can be supplied with a step-shaped sawtooth wave voltage which sequentially corrects the potential difference generated due to the filament length and its operating position in the vertical direction. When a signal input method is employed in which the scattering in the cut-off characteristic of the electron beam emission, which is determined between grid bores $P_1$ of grid group $G_1$ and filament group F, is stored in and corrected by an LSI memory, the drive circuit of FIG. 11 can be utilized. The divided simultaneous drive video signal is applied to grid group $G_1$. If the scattering of the cut-off characteristic is taken into consideration, the divided simultaneous drive video signal applied across grid group $G_1$ and filament group F can preferably be a PWM (pulse width modulation) system which corresponds to each grid and filament.

According to the illustrated embodiment of the invention, since the electron gun and the vertical and horizontal deflection means are provided for each of the phosphor screen portions, the display can be performed without using the entire apparatus, if desired. While the aspect ratio of the picture screen of the display apparatus is 1:2, only the part thereof where the aspect ratio is 3:4 is used to display an image. In such a case, in order to switch the ratio from 1:2 to 3:4, it is sufficient that no signal be supplied to filament F and first grid $G_1$ which both do not contribute to the display.

It is also possible that at every phosphor screen portion the video signal and the vertical and horizontal deflections are independently supplied thereto. In such a case, since each phosphor screen portion can be each used as an independent display apparatus, various special effects such as a picture-in-picture can be performed.

The number of horizontal scanning lines can be easily converted from, for example, the Japanese and American standard system of 525 lines to the European standard system of 625 lines or further to high definition system of 1125 lines.

Although in the above description the electron beam generating source is made of a tungsten filament coated with an active agent, a dot-shaped cathode can be positioned to correspond with each grid aperture group $P_1$ of first grid group $G_1$. An independent, common electron beam source can be provided with the electron beam therefrom assigned and sequentially used with the respective grid apertures.

As described above, an image display apparatus according to the present invention is simple in construction, large in size and flat or thin in thickness.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

I claim as my invention:

1. An image display apparatus for displaying an image from a video signal having a horizontal period, comprising:
   a phosphor screen having portions aligned horizontally and vertically in rows and columns, respectively;
   electron gun means associated with each of said portions of said phosphor screen;
   horizontal and vertical deflection means associated with each of said portions of said phosphor screen;
   means for simultaneously driving said horizontal deflection means associated with each row of said horizontally aligned portions of said phosphor screen;
   means for driving said vertical deflection means in a step-like manner in synchronism with said horizontal period;
   means for storing at least one horizontal period of said video signal; and
   means for dividing the stored video signal corresponding to said phosphor screen portions and supplying the divided video signal to said electron gun means associated with the respective phosphor screen portions.

2. The apparatus of claim 1; and further comprising red, green and blue color phosphor stripes repeated at a predetermined pitch on said phosphor screen.

3. The apparatus of claim 2; and further comprising guard bands disposed between said phosphor stripes.

4. The apparatus of claim 3, wherein said phosphor screen portions have adjacent boundaries parallel to said phosphor stripes; and wherein one of said guard bands is positioned to coincide with each of said boundaries parallel to said phosphor stripes.

5. The apparatus of claim 1; wherein said means for simultaneously driving drives only one row of said horizontal deflection means at a time.

6. The apparatus of claim 1; and further comprising separating means for dividing said video signal into red, blue, and green primary color signals; and wherein said means for storing includes primary color signal charge-coupled means for storing said red, blue and green primary color signals.

7. The apparatus of claim 6; wherein said primary color signal charge-coupled means includes a red primary color signal charge-coupled means, a blue primary color signal charge-coupled means, and a green primary color signal charge-coupled means.

8. The apparatus of claim 7; wherein said means for dividing includes switch means and second charge-coupled means for each of said vertically aligned phosphor screen portions, said switch means for selectively connecting said primary color signal charge-coupled means to said second charge-coupled means, and said second charge-coupled means being coupled to said electron gun means.

9. The apparatus of claim 8; wherein said charge-coupled means are charge-coupled devices.

10. The apparatus of claim 1; wherein said vertical deflection means are a plurality of pairs of horizontally extending electrodes, each of said pairs being arranged in a V-shape, with the openings of said V-shaped pairs of electrodes facing said phosphor screen.

11. The apparatus of claim 10; wherein said horizontal deflection means are a plurality of pairs of vertically extending electrodes, each of said pairs being arranged in a V-shape, with the openings of said V-shaped pairs of electrodes facing said phosphor screen.

12. The apparatus of claim 11; wherein said vertical deflection means are positioned between said electron gun means and said horizontal deflection means.

13. The apparatus of claim 1; wherein each said electron gun means comprises filament means for generating an electron beam and grid means for controlling said electron beam.

14. The apparatus of claim 13; wherein said grid means includes first grid means for modulating said electron beam, second grid means for gating said electron beam, and third, fourth and fifth grid means for accelerating and converging said electron beam.

15. The apparatus of claim 14; wherein said first grid means is a vertically extending metal plate for each of the vertically aligned columns of said phosphor screen portions, each of said metal plates having a substantially U-shaped horizontal cross-section, with the open side of said metal plate facing away from said phosphor screen; and wherein said filament means is a plurality of vertically extending filaments, with one filament associated with each of said metal plates.

16. The apparatus of claim 15; wherein said second grid means is a horizontally extending metal plate for each horizontal row of said phosphor screen portions, each of said metal plates having a substantially U-shaped vertical cross-section, with the open side of said metal plate facing toward said phosphor screen.

17. The apparatus of claim 16; wherein each of said third and fifth grid means is a plurality of planar metal plates.

18. The apparatus of claim 17; wherein said fourth grid means is a single planar metal plate.

19. The apparatus of claim 17; wherein said grid means have bores formed therein and aligned with said filaments.

* * * * *